(12) United States Patent
Duesel, Jr. et al.

(10) Patent No.: US 8,382,075 B2
(45) Date of Patent: *Feb. 26, 2013

(54) AIR STRIPPER

(75) Inventors: Bernard F. Duesel, Jr., Goshen, NY (US); Michael J. Rutsch, Tulsa, OK (US)

(73) Assignee: Heartland Technology Partners, LLC, St. Louis, MO (US)

( * ) Notice: Subject to any disclaimer, the term of this patent is extended or adjusted under 35 U.S.C. 154(b) by 799 days.

This patent is subject to a terminal disclaimer.

(21) Appl. No.: 11/625,002

(22) Filed: Jan. 19, 2007

(65) Prior Publication Data

US 2008/0174033 A1    Jul. 24, 2008

(51) Int. Cl.
*B01F 3/04*      (2006.01)
*B01D 21/24*    (2006.01)
*C02F 3/28*      (2006.01)

(52) U.S. Cl. ........ 261/123; 261/124; 261/126; 210/101; 210/109; 210/137; 210/218; 210/220

(58) Field of Classification Search .................. 210/218, 210/220, 101, 108, 744, 750, 127, 137, 221.2, 210/109; 261/121.1, 123, 124, DIG. 9, DIG. 70, 261/7, 26, 29; 110/215; 96/247, 248, 250
See application file for complete search history.

(56) References Cited

U.S. PATENT DOCUMENTS
(Continued)

FOREIGN PATENT DOCUMENTS
CL    757-2004    4/2004
DE    556 455     8/1932
(Continued)

OTHER PUBLICATIONS

A.G. Jones, *Liquid Circulation in a Draft-Tube Bubble Column*, Chemical Engineering Science, vol. 40, No. 3, pp. 449-462, 1985, Pergarmon Press Ltd., Great Britian.

(Continued)

*Primary Examiner* — Lucas Stelling
(74) *Attorney, Agent, or Firm* — Marshall, Gerstein & Borun LLP

(57) ABSTRACT

An air stripper in the form of an submerged gas evaporator or a submerged gas reactor that includes a vessel, a gas delivery tube partially disposed within the vessel to deliver a gas into the vessel and a contaminated liquid inlet that provides a contaminated liquid to the vessel at a rate sufficient to maintain a controlled constant level of process fluid within the vessel. A weir is disposed within the vessel adjacent the gas delivery tube to form a first fluid circulation path between a first weir end and a wall of the vessel and a second fluid circulation path between a second weir end and an upper end of the vessel. During operation, gas introduced through the tube mixes with the process fluid and the combined gas and fluid flow at a high rate with a high degree of turbulence along the first and second circulation paths defined around the weir, thereby promoting vigorous mixing and intimate contact between the gas and the process fluid. This turbulent flow develops a significant amount of interfacial surface area between the gas and the process fluid resulting in a reduction of the required residence time of the gas within the process fluid to achieve thermal equilibrium and/or to drive chemical reactions to completion, all of which leads to a more efficient and complete evaporation, chemical reaction, or combined evaporation and chemical reaction process.

28 Claims, 7 Drawing Sheets

U.S. PATENT DOCUMENTS

| | | | |
|---|---|---|---|
| 2,387,818 A | 10/1945 | Wethly | |
| 2,468,455 A | 4/1949 | Metziger | |
| 2,619,421 A | 11/1952 | Greenfield | |
| 2,651,647 A | 9/1953 | Greenfield | |
| 2,658,735 A * | 11/1953 | De Ybarrondo | 261/77 |
| 2,790,506 A | 4/1957 | Vactor | |
| 2,867,972 A | 1/1959 | Hokderreed et al. | |
| 2,879,838 A | 3/1959 | Flynt et al. | |
| 2,890,166 A | 6/1959 | Heinze | |
| 2,911,421 A | 11/1959 | Greenfield | |
| 2,911,423 A | 11/1959 | Greenfield | |
| 2,979,408 A | 4/1961 | Greenfield | |
| 2,981,250 A | 4/1961 | Steward | |
| 3,060,921 A | 10/1962 | Luring et al. | |
| 3,076,715 A | 2/1963 | Greenfield | |
| 3,211,538 A | 10/1965 | Gross et al. | |
| 3,212,235 A | 10/1965 | Markant | |
| 3,215,189 A | 11/1965 | Bauer | |
| 3,251,398 A | 5/1966 | Greenfield | |
| 3,284,064 A | 11/1966 | Kolm et al. | |
| 3,304,991 A | 2/1967 | Greenfield | |
| 3,323,575 A | 6/1967 | Greenfield | |
| 3,405,918 A | 10/1968 | Calaceto et al. | |
| 3,432,399 A | 3/1969 | Schutt | |
| 3,539,549 A | 11/1970 | Greenfield | |
| 3,601,374 A | 8/1971 | Wheeler | |
| 3,638,924 A | 2/1972 | Calaceto et al. | |
| 3,713,786 A | 1/1973 | Umstead | |
| 3,716,458 A | 2/1973 | Greenfield et al. | |
| 3,743,483 A | 7/1973 | Shah | |
| 3,756,580 A | 9/1973 | Dunn | |
| 3,762,893 A | 10/1973 | Larsen | |
| 3,782,300 A | 1/1974 | White et al. | |
| 3,789,902 A | 2/1974 | Shah et al. | |
| 3,838,974 A | 10/1974 | Hemsath et al. | |
| 3,840,002 A | 10/1974 | Douglas et al. | |
| 3,844,748 A | 10/1974 | Lanier | |
| 3,855,079 A | 12/1974 | Greenfield et al. | |
| 3,870,585 A | 3/1975 | Kearns et al. | |
| 3,876,490 A | 4/1975 | Tsuruta | |
| 3,898,134 A | 8/1975 | Greenfield et al. | |
| 3,917,508 A | 11/1975 | Greenfield et al. | |
| 3,925,148 A | 12/1975 | Erwin | |
| 3,947,327 A | 3/1976 | Greenfield et al. | |
| 3,950,230 A | 4/1976 | Greenfield et al. | |
| 4,007,094 A | 2/1977 | Greenfield et al. | |
| 4,013,516 A | 3/1977 | Greenfield et al. | |
| 4,026,682 A | 5/1977 | Pausch | |
| 4,060,587 A | 11/1977 | Lewis | |
| 4,119,538 A | 10/1978 | Yamauchi et al. | |
| 4,230,536 A | 10/1980 | Sech | |
| 4,259,185 A * | 3/1981 | Mixon | 210/220 |
| 4,270,974 A | 6/1981 | Greenfield et al. | |
| 4,276,115 A | 6/1981 | Greenfield et al. | |
| 4,285,578 A | 8/1981 | Yamashita et al. | |
| 4,300,924 A * | 11/1981 | Coyle | 96/247 |
| 4,336,101 A | 6/1982 | Greenfield et al. | |
| RE31,185 E | 3/1983 | Greenfield et al. | |
| 4,432,914 A | 2/1984 | Schifftner | |
| 4,440,098 A * | 4/1984 | Adams | 261/118 |
| 4,518,458 A | 5/1985 | Greenfield et al. | |
| 4,608,120 A | 8/1986 | Greenfield et al. | |
| 4,648,973 A | 3/1987 | Hultholm et al. | |
| 4,683,062 A | 7/1987 | Krovak et al. | |
| 4,863,644 A | 9/1989 | Harrington et al. | |
| 4,913,065 A | 4/1990 | Hemsath | |
| 5,009,511 A | 4/1991 | Sarko et al. | |
| 5,030,428 A | 7/1991 | Dorr et al. | |
| 5,032,230 A | 7/1991 | Shepherd | |
| 5,076,895 A | 12/1991 | Greenfield et al. | |
| 5,132,090 A | 7/1992 | Volland | |
| 5,154,898 A | 10/1992 | Ajinkya et al. | |
| 5,190,670 A | 3/1993 | Stearns | |
| 5,238,580 A * | 8/1993 | Singhvi | 210/718 |
| 5,279,646 A | 1/1994 | Schwab | |
| 5,336,284 A | 8/1994 | Schifftner | |
| 5,342,482 A | 8/1994 | Duesel et al. | |
| 5,378,267 A | 1/1995 | Bros et al. | |
| 5,484,471 A | 1/1996 | Schwab | |
| 5,512,085 A | 4/1996 | Schwab | |
| 5,552,022 A | 9/1996 | Wilson | |
| 5,585,005 A | 12/1996 | Smith et al. | |
| 5,636,623 A | 6/1997 | Panz et al. | |
| 5,656,155 A | 8/1997 | Norcross et al. | |
| 5,759,233 A | 6/1998 | Schwab | |
| 5,934,207 A | 8/1999 | Echols et al. | |
| 5,968,352 A | 10/1999 | Ditzler | |
| 6,007,055 A | 12/1999 | Schifftner | |
| 6,149,137 A | 11/2000 | Johnson et al. | |
| 6,293,277 B1 | 9/2001 | Panz et al. | |
| 6,383,260 B1 | 5/2002 | Schwab | |
| 6,391,100 B1 | 5/2002 | Hogan | |
| 6,402,816 B1 * | 6/2002 | Trivett et al. | 95/226 |
| 6,485,548 B1 | 11/2002 | Hogan | |
| 6,547,855 B1 | 4/2003 | Schmidtke | |
| 6,616,733 B1 | 9/2003 | Pellegrin | |
| 6,719,829 B1 | 4/2004 | Schwab | |
| 6,913,671 B2 | 7/2005 | Bolton et al. | |
| 7,074,339 B1 | 7/2006 | Mims | |
| 7,111,673 B2 | 9/2006 | Hugill | |
| 7,142,298 B2 | 11/2006 | Nuspliger | |
| 7,144,555 B1 | 12/2006 | Squires et al. | |
| 7,156,985 B1 | 1/2007 | Frisch | |
| 7,332,010 B2 | 2/2008 | Steiner | |
| 7,402,247 B2 | 7/2008 | Sutton | |
| 7,416,172 B2 * | 8/2008 | Duesel et al. | 261/124 |
| 7,416,177 B2 | 8/2008 | Suzuki et al. | |
| 7,424,999 B2 | 9/2008 | Xu et al. | |
| 7,459,135 B2 | 12/2008 | Pieterse et al. | |
| 7,572,626 B2 | 8/2009 | Frisch et al. | |
| 7,591,309 B2 | 9/2009 | Minnich et al. | |
| 7,758,819 B2 | 7/2010 | Nagelhout | |
| 8,136,797 B2 * | 3/2012 | Duesel et al. | 261/77 |
| 2002/0069838 A1 * | 6/2002 | Rautenbach et al. | 123/25 A |
| 2002/0158024 A1 | 10/2002 | Van Slyke et al. | |
| 2004/0040671 A1 | 3/2004 | Duesel et al. | |
| 2004/0045681 A1 | 3/2004 | Bolton et al. | |
| 2004/0213721 A1 | 10/2004 | Arno et al. | |
| 2005/0074712 A1 | 4/2005 | Brookshire et al. | |
| 2007/0251650 A1 | 11/2007 | Duesel et al. | |
| 2008/0213137 A1 | 9/2008 | Frisch et al. | |

FOREIGN PATENT DOCUMENTS

| | | |
|---|---|---|
| DE | 11 73 429 | 7/1964 |
| FR | 2 441 817 | 6/1980 |
| GB | 383 570 | 11/1932 |
| GB | 463 770 | 4/1937 |
| WO | WO-2004/022487 | 3/2004 |

OTHER PUBLICATIONS

Hirotsugu Hattori et al., *Fluid and Solids Flow Affecting the Solids Circulation Rate in Spouted Beds with a Draft Tube*, Journal of Chemical Engineering of Japan, vol. 37, No. 9, pp. 1085-1091, 2004, Shinshu University, Japan.

M. Yoshino et al., *Removal and Recovery of Phosphate and Ammonium as Struvite from Supernatant in Anaerobic Digestion*, Water Science and Technology, vol. 48, No. 1, pp. 171-178, 2003, IWA Publishing, Japan.

D. Fox et al., *Control Mechanisms of Fluidized Solids Circulation Between Adjacent Vessels*, AIChE Journal, Dec. 1989, vol. 35, No. 12, pp. 1933-1941, Universite de Technologie de Compiegne, France.

Liang-Shih Fan et al., *Some Remarks on Hydrodynamic Behavior of a Draft Tube Gas-Liquid-Solid Fluidized Bed*, Department of Chemical Engineering, The Ohio State University, Columbus, Ohio 43210.

N.D. Barrett et al., *The Industrial Potential and Economic Viability of Spouted Bed Processes*, Chemeca 85, paper D4c, pp. 401-405, The Thirteenth Australasian Conference on Chemical Engineering, Perth, Australia, Aug. 1985.

J.K. Claflin, *Intraparticle Conduction Effects on the Temperature Profiles in Spouted Beds*, Chemeca 85, paper D9b, pp. 471-475, The Thirteenth Australasian Conference on Chemical Engineering, Perth, Australia, Aug. 1985.

Dawn Smith, *Sludge-U-Like, As the Ban on Sea Disposal of Sewage Waste Looms, Technologies that can Deliver Cleaner, Thicker and More Farmer-Friendly Sludges are Gaining Popularity*, Water Bulletin 708, Jun. 21, 1996.

Harry Brandt, et al., *Treatment Process for Waste Water Disposal of the "Morcinek" Mine Using Coalbed Methane*, Conference on Coalbed Methane Utilization, Oct. 5-7, 1994, Katowice, Poland.

Yutaka Miyake et al., *Performance Characteristics of High Speed-Type Cross Flow Turbine*, 1993.

Ho-Ming Yeh et al., *Double-Pass Heat or Mass Transfer Through a Parallel-Plate Channel with Recycle*, International Journal of Hat and Mass Transfer 43 pp. 487-491, 2000, Department of Chemical Engineering, Tamkang University, Tamisui, Taipei 251, Taiwan.

Sathyanarayana et al., *Circular C.W. Intake System—A Research Opinion*, Seventh Technical Conference of the British Pump Manufacturer's Association, paper 21, pp. 293-313, 1981.

Caridad Talbert et al., *The Elecrospouted Bed*, IEEE Transactions on Industry Applications, vol. 1A-20, No. 5, Sep./Oct. 1984, pp. 1220-1223.

Wayne J. Genck, *Guidelines for Crystallizer Selection and Operation*, CEP, Oct. 2004, pp. 26-32. www.cepmagazine.org.

M. K. Bennett et al., *Design of a Software Application for the Simulation and Control of Continuous and Batch Crystallizer Circuits*, Advances in Engineering Sfotware 33, 2002, pp. 365-374, Department of Chemical and Biochemical Engineering, Faculty of Engineering Science, University of Western Ontario, London, Ont. Canada N6A 5B9.

G. A. St. Onge et al., *Start-Up, Testing, and Performance of the First Bulb-Type Hydroelectric Project in the U.S.A.*, IEEE Transactions on Power Apparatus Systems, vol. PAS-101, No. 6, Jun. 1982, pp. 1313-1321.

Nely T. Padial et al., *Three-Dimensional Simulation of a Three-Phase Draft-Tube Bubble Column*, Chemical Engineering Science 55 (2000), pp. 3261-3273.

J. K. Claflin et al., *The Use of Spouted Beds for the Heat Treatment of Grains*, Chemeca 81, The 9th Australasian Conference on Chemical Engineering, Christchurch, New Zealand, Aug. 30 to Sep. 4, 1981, pp. 65-72.

R. Swaminathan et al., *Some Aerodynamic Aspects of Spouted Beds of Grains*, Department of Chemical Engineering, McGill University, Montreal, Quebec, Canada, pp. 197-204.

W.A. Cross et al., *Leachate Evaporation by Using Landfill Gas*, Proceedings Sardinia 97, Sixth Landfill Symposium, S. Margherita di Pula, Cagliari, Italy, Oct. 13-17, 1997, pp. 413-422.

Z. H. Ye et al., *Removal and Distribution of Iron, Manganese, Cobalt, and Nickel Within a Pennsylvania Constructed Wetland Treating Coal Combustion By-Product Leachate*, J. Environ. Qual. 30:1464-1473, 2001.

R. Williams et al., *Aspects of Submerged Combustion As a Heat Exchange Method*, Trans IChemE, vol. 71, Part A, May 1993, pp. 308-309.

J. C. Mueller et al., *Rotating Disk Looks Promising for Plant Wastes.*

Kenneth Dunn, *Incineration's Role in Ultimate Disposal of Process Wastes*, Chemical Engineering, Deskbook Issue, Oct. 6, 1975, pp. 141-150.

Harry Berg, *The Development of the Controlled Buoyancy System for Installation of Submerged Pipelines*, Journal AWWA, Water Technology/Quality, Mar. 1977, pp. 214-218.

Yasutoshi Shimizu et al., *Filtration Characteristics of Hollow Fiber Microfiltration Membranes Used in Membrane Bioreactor for Domestic Wastewater Treatment*, Wat. res. vol. 30, No. 10, pp. 2385-2392, 1996.

Philip Bachand et al., *Denitrification in Constructed Free-Water Surface Wetlands: II. Effects of Vegetation and Temperature*, Ecological Engineering 14, pp. 17-32, 2000.

M. Etzensperger et al., *Phenol Degradation in a Three-Phase Biofilm Fluidized Sand Bed Reactor*, Bioprocess Engineering 4, pp. 175-181, 1989.

G. I. Cherednichenko et al., *Disposal of Saline Wastes From Petroleum Refineries*, All-Union Scientific-Research and Planning-Design Institute of the Petroleum Refining and Petrochemical Industry, Translated from Khimiya I Tekhnologiya Topliv I Masel, No. 9, pp. 37-39, Sep. 1974.

E. L. Durkee et al., *Field Tests of Salt Recovery System for Spent Pickle Brine*.

Marko Hocevar et al., *The Influence of Draft-Tube Pressure Pulsations on the Cavitation-Vortex Dynamics in a Francis Turbine*, Journal of Mechanical Engineering 49, 2003, pp. 484-498.

German Kurz, Tauchbrenner, Ol U. Gasfeuerung, 18 (3), 1973, pp. 171-180.

Schoene, O, "Die Entolung des Abdampfes und der Kondensate von Kolbendampfmaschinen," Braunkohle, 31:82-92 (1932).

Alabovskij et al., *Evaporation Des Eaux De Lavage De Chaudieres Dans Des Appareils a Combustion Immergee*, Promyshl. Energet, 1975 (4), pp. 38-39.

International Search Report issued in PCT/US2006/028515 mailed on Nov. 14, 2006.

International Preliminary Report on Patentability for Application No. PCT/US2007/001632, dated Jul. 21, 2009.

International Preliminary Report on Patentability for Application No. PCT/US2007/001487, dated Jul. 21, 2009.

International Preliminary Report on Patentability for Application No. PCT/US2007/001633, dated Jul. 21, 2009.

International Preliminary Report on Patentability for Application No. PCT/US2007/001634, dated Jul. 21, 2009.

LFG Specialties, LLC. 2006 Product Catalog.

Screen shots from video on LFG website taken Jan. 18, 2011 (http://www.shawgrp.com/markets/envservices/envsolidwaste/swlfg).

English Translation of Hage, H., "The MeMon Experiment: A Step towards Large-Scale Processing of Manure," Applied Science, 4 (1988).

Notice of Allowance for U.S. Appl. No. 11/625,159, dated Jul. 9, 2010.

Office Action for U.S. Appl. No. 11/625,024, dated Nov. 27, 2009.

Office Action for U.S. Appl. No. 11/625,024, dated Jun. 18, 2010.

Final Office Action for U.S. Appl. No. 11/625,024, dated Dec. 8, 2010.

Office Action for U.S. Appl. No. 11/625,022, dated Jun. 22, 2010.

Notice of Allowance for U.S. Appl. No. 11/625,022, dated Jan. 24, 2011.

Office action from Chilean Patent Application No. 238-2007.

English language translation of an office action from Chilean Patent Application No. 237-2007.

* cited by examiner

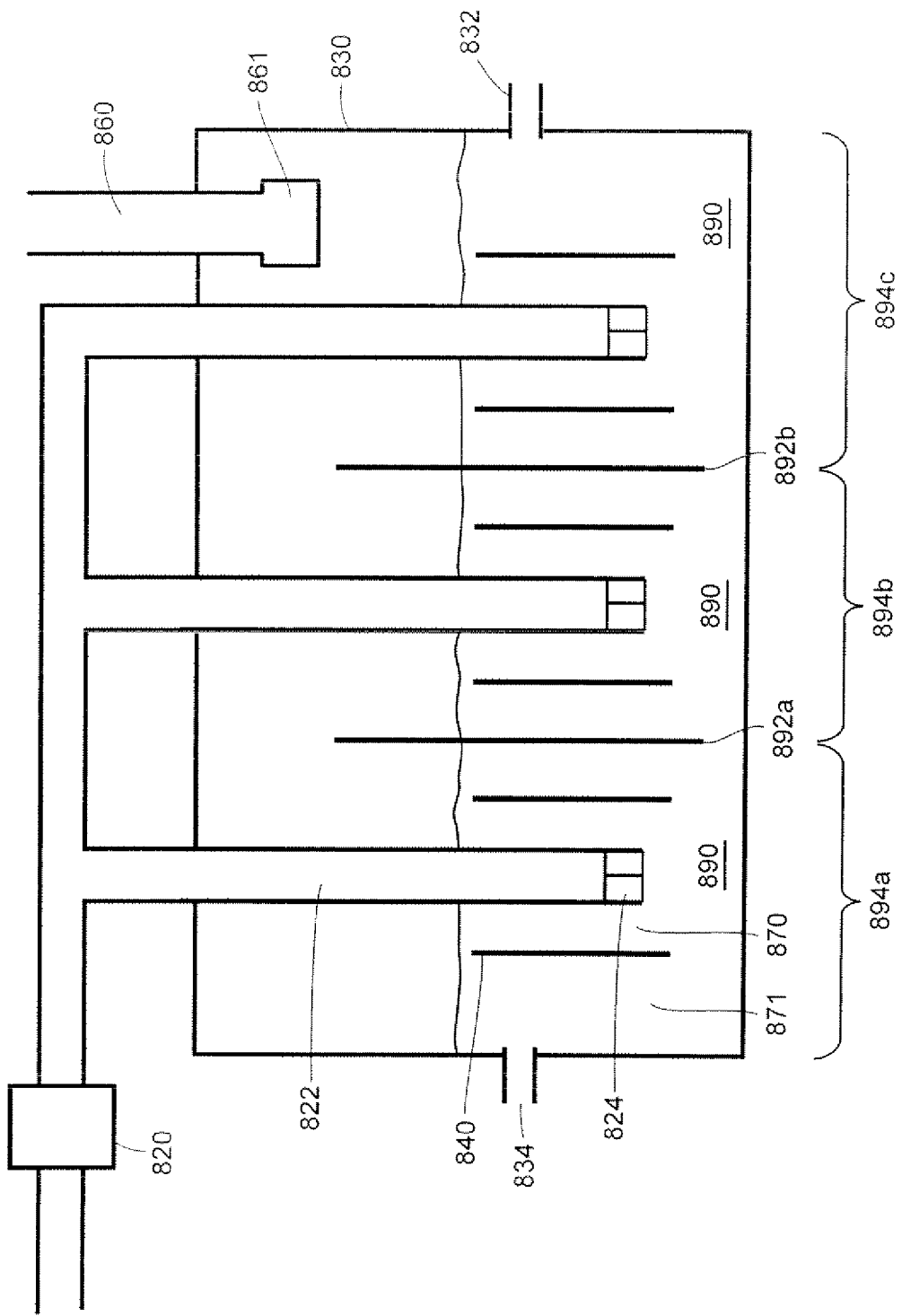

AIR STRIPPER

FIELD OF THE DISCLOSURE

The disclosure relates generally to devices for contacting gases and liquids, and more specifically, to air strippers that remove contaminants from liquid streams such as volatile substances from contaminated water.

BACKGROUND

Air strippers generally partition volatile compounds found within contaminated liquids, such as groundwater, between liquid and gas phases by bringing the liquid phase into intimate contact with a stream of air. Volatile contaminants are removed from the liquid as the air is discharged from the air stripper.

Partitioning of volatile compounds between gas and liquid phases is a mass transfer process that is closely defined by Henry's law. According to Henry's law, the equilibrium concentration of a volatile compound in the water phase is proportional to the partial pressure of the compound in the air that is in contact with the water. Absent any of the volatile compound in the air and given adequate time, migration will proceed from the liquid phase into the gas phase until equilibrium is reached. As the temperature increases at a fixed pressure, the Henry's law constant of proportionality for a given volatile compound increases, meaning that the equilibrium concentration for the compound in the water phase decreases and the equilibrium concentration in the air phase increases. Thus, higher operating temperatures within air strippers increase both the rate of migration due to the increase in the Henry's law constant (the driving force for the mass transfer) and the percentage of the original mass of the volatile compound within the liquid that can migrate to the air stream as the system approaches equilibrium.

Several conventional types of air stripping methods that are commonly used include, for example, packed towers, diffused aeration, tray aeration, and spray aeration. Of these, packed towers and diffused aeration are the most common methods. The designs of each of these types of air strippers include means to create zones where the gas and liquid are brought into intimate contact over a large interfacial surface area. The particular method used to create interfacial surface area affects the size of the air stripper and compact designs are generally more desirable considering the value of floor and air space within industrial facilities and the negative aesthetic impact of larger units when installed outdoors.

Typical packed tower air strippers include a spray nozzle or weir at the top of a tower to uniformly distribute contaminated water over a column of packing, a fan to force air counter current to the water flow, and a sump at the bottom of the tower to collect decontaminated water. The packed tower type air stripper thus increases the interfacial surface area between the water and air by distributing the water as a downward flowing film on the extended surface of the packing material. Accordingly, packed tower type air strippers generally require regular maintenance (to clean the contact surfaces) and occasionally become clogged with suspended matter that is either carried in with the feed liquid or formed by compounds that precipitate out of the water. Clogged passageways in packing can also create conditions that stimulate biological growth further compounding the problem of clogging. An additional drawback to the packed tower type air stripper is that a balance must be struck between the amount of void space in the packed column and the restriction that the packing presents to the flow of air in the gas-liquid contact zone. The void space creates a tortuous path that forces the gas into intimate contact with the liquid film flowing over the packing. Smaller void space increases the velocity of the gas over the liquid film and enhances turbulence, which favorably affects the rate of mass transfer from the liquid to the gas phase. Because a finite amount of void space must be employed and additional space is occupied by the mass of packing, the volume of the gas-liquid contact zone of a packed tower is larger than the required volume of the gas-liquid contact zone within air strippers where the gas is introduced directly into the liquid phase, such as diffused aeration. In typical packed columns this additional volume compared to diffused aeration is reflected in increased vertical height. For example, to achieve approximately 99% efficiency, a typical packed tower type air stripper would require 15 to 20 feet of conventional packing. This can lead to space problems in certain situations.

On the other hand, diffused aeration devices, typically in the form of aeration tanks, are generally fairly low profile devices. In a typical aeration tank air bubbles are introduced into a tank, of contaminated liquid through a distribution manifold that often includes small openings and/or diffuser devices such as screens that are usually located near the bottom of the tank and are designed to disperse the gas as uniformly as a possible throughout the liquid. Baffles and multiple gas distribution units may be used to ensure adequate dispersion of air bubbles and residence time for stripping to occur. Aeration tanks are prone to problems similar to the packed tower type systems in that the openings in the manifold and/or diffuser devices of an aeration tank may become clogged with suspended solids and/or biological growth. This problem is compounded by the fact that maximizing the interfacial surface area between gas and liquid requires minimizing bubble size (i.e., smaller opening in the manifold and/or diffuser screens).

Other than potential fouling and the need for periodic cleaning, traditional packed tower and diffused aeration type air strippers are generally good for remediation of liquids that are contaminated with volatile or semi-volatile organic compounds. To increase the rate and percentage of mass transfer of such compounds, the contaminated liquid is often preheated prior to treatment. Accordingly, the energy costs of such systems are quite high.

One variation of a diffused aeration type of air stripper is the submerged gas evaporators, also known as submerged gas reactors and/or combination submerged gas evaporator/reactor systems, in which gas is dispersed within a liquid. U.S. Pat. No. 5,342,482, which is hereby incorporated by reference, discloses a common type of submerged gas evaporator, in which combustion gas is generated and delivered though an inlet pipe to a dispersal unit submerged within the liquid to be evaporated. The dispersal unit includes a number of spaced-apart gas delivery pipes extending radially outward from the inlet pipe, each of the gas delivery pipes having small holes spaced apart at various locations on the surface of the gas delivery pipe to disperse the combustion gas as small bubbles as uniformly as practical across the cross-sectional area of the liquid held within the processing vessel. According to current understanding within the prior art, this design provides desirable intimate contact between the liquid and the combustion gas over a large interfacial surface area while also promoting thorough agitation of the liquid within the processing vessel.

Because submerged gas evaporators/reactors do not require heal exchangers with solid heated surfaces to raise the operating temperature of the process, these processors provide a significant advantage compared to conventional air strippers when contact between a heated liquid stream and a gas stream is desirable.

Suspended solids that may be carried into the air stripper with the contaminated fluid and/or particles that may precipitate from the liquid undergoing processing can form deposits on extended surfaces of liquid distribution devices used in conventional air strippers. Buildup of deposits on these extended surfaces and the possible formation of large crystals of precipitates and/or agglomerates related to solid particles can block passages within processing equipment such as passages in gas distribution manifold openings and diffuser devices used in diffused aeration systems or in the system described in U.S. Pat. No. 5,342,482. Such deposits and blockages reduce the efficiency of the air stripper and necessitate frequent cleaning cycles to avoid sudden unplanned shutdowns of the air stripper.

Additionally, most air stripping systems are prone to problems related to carryover of entrained liquid droplets that are swept from the liquid phase into the gas phase as the gas passes over and disengages from the liquid phase. For this reason, most air stripper systems include one or more devices to minimize entrainment of liquid droplets and/or to capture entrained liquid droplets (e.g., demisters) while allowing for separation of the entrained liquid droplets from the exhaust gas. The need to mitigate carryover of entrained liquid droplets may be related to one or more factors including conformance with environmental regulations, conformance with health, and safety regulations and controlling losses of material that might have significant value.

Unlike conventional packed tower and tray type air stripping systems where mass is transferred from the liquid being processed to the air stream at locations along extended surfaces within the air stripper, mass transfer within submerged gas and diffused aeration evaporators/reactors takes place at the interfacial surface area between a discontinuous gas phase dispersed within a continuous liquid phase. Compared to the fixed extended surfaces employed in conventional packed tower and tray type air stripping systems, there are no extended solid surfaces within submerged gas and diffused aeration processors. Thus, because submerged gas processors and diffused aeration tank air strippers in general rely on dynamic renewable interfacial surface area that is constantly being formed between liquid and gas phases, the problem of deposits forming on extended surfaces is eliminated. The dynamic interfacial surface area that is constantly renewed by a steady flow of gas into the liquid phase of submerged gas and diffused aeration tank air strippers allows the air and liquid phases to remain in contact for a finite period of time before disengaging. This finite period of time is called the residence time of the gas within the evaporation, or evaporation/reaction zone.

Submerged gas and diffused aeration evaporators/reactors also tend to mitigate the formation of large crystals of compounds that precipitate from the liquid phase because dispersing the gas beneath the liquid surface provides mixing within the evaporation or the evaporation/reaction zone, which is a less desirable environment for crystal growth than a more quiescent zone. Further, active mixing within an evaporation or reaction vessel tends to maintain solid particles in suspension and thereby mitigates blockages that are related to settling and/or agglomeration of suspended solids.

However, mitigation of crystal growth and settlement or agglomeration of suspended solids is dependent on the degree of mixing achieved within a particular submerged gas or diffused aeration evaporator/reactor, and not all submerged gas or diffused aeration evaporator/reactor designs provide adequate mixing to prevent large crystal growth and related blockages. Therefore, while the dynamic renewable interface feature of submerged gas and diffused aeration evaporators/reactors eliminates the potential for fouling liquids to coat extended surfaces, conventional submerged gas and diffused aeration evaporators/reactors are still subject to potential blockages of small openings in the devices used to disperse gas into liquid.

Direct contact between hot gas and liquid undergoing processing within a submerged gas evaporator/reactor provides excellent heat transfer efficiency. If the residence time of the gas within the liquid is adequate for the gas and liquid temperatures to reach equilibrium, a submerged gas evaporator/reactor operates at a very high level of overall energy efficiency. For example, when hot gas is dispersed in a liquid that is at a lower temperature than the gas and the residence time is adequate to allow the gas and liquid temperatures to reach equilibrium at the adiabatic saturation temperature for the system, all of the available driving forces to affect mass and heat transfer, and allow chemical and physical changes to proceed to equilibrium stages, will have been consumed within the process. The minimum residence time to attain equilibrium of gas and liquid temperatures within the evaporation, reaction or combined reaction/evaporation zone of a submerged gas evaporator/reactor is a function of factors that include, but are not limited to, the temperature differential between the hot gas and liquid, the properties of the gas and liquid phase components, the properties of the resultant gas-liquid mixture, the net heat absorbed or released through any chemical reactions and the extent of interfacial surface area generated as the hot gas is dispersed into the liquid.

Given a fixed set of values for temperature differential, properties of the gas and the liquid components, properties of the gas-liquid mixture, heats of reaction and the extent of the interfacial surface area, the residence time of the gas is a function of factors that include the difference in specific gravity between the gas and liquid or buoyancy factor, and other forces that affect the vertical rate of rise of the gas through the liquid phase including the viscosity and surface tension of the liquid. Additionally, the flow pattern of the liquid including any mixing action imparted to the liquid such as that created by the means chosen to disperse the gas within the liquid affect the rate of gas disengagement from the liquid.

Submerged gas evaporators/reactors may be built in various configurations. One common type of submerged gas evaporator/reactor is the submerged combustion gas evaporator that generally employs a pressurized burner mounted to a gas inlet tube that serves as both a combustion chamber and as a conduit to direct the combustion gas to a dispersion system located beneath the surface of liquid held within an evaporation vessel. The pressurized burner may be fired by any combination of conventional liquid or gaseous fuels such as natural gas, oil or propane; any combination of non-conventional gaseous or liquid fuels such as biogas (e.g., landfill gas) or residual oil; or any combination of conventional and non-conventional fuels.

Other types of submerged gas evaporators/reactors include hot gas evaporators where hot gas is either injected under pressure or drawn by an induced pressure drop through a dispersion system located beneath the surface of liquid held within an evaporation vessel. While hot gas evaporators may utilize combustion gas such as hot gas from the exhaust stacks of combustion processes, gases other than combustion gases or mixtures of combustion gases and other gases may be employed as desired to suit the needs of a particular evaporation process. Thus, waste heat in the form of hot gas produced in reciprocating engines, turbines, boilers or flare stacks may be used within, hot gas evaporators. In other forms, hot gas evaporators may be configured to utilize specific gases or mixtures of gases that are desirable for a particular process such as air, carbon dioxide or nitrogen that are indirectly heated within heat exchangers prior to being injected into or drawn through the liquid contained within an evaporation vessel.

Regardless of the type of submerged gas evaporator/reactor or the source of the gas used within the submerged gas evaporator/reactor, in order for the process to continuously perform effectively, reliably and efficiently, the design of the submerged gas evaporator/reactor must include provisions for efficient heat and mass transfer between gas and liquid phases, control of entrained liquid droplets within the exhaust gas, mitigating the formation of large crystals or agglomerates of particles and maintaining the mixture of solids and liquids within the submerged gas evaporator/reactor vessel in a homogeneous state to prevent settling of suspended particles carried within the liquid feed and/or precipitated solids formed within the process.

SUMMARY OF THE DISCLOSURE

A simple and efficient air stripper includes a vessel and one or more tubes partially disposed within the vessel, which are adapted to transport a gas into the interior of the vessel. The vessel has a fluid inlet that transports a contaminated liquid into the vessel at a rate that maintains the liquid inside the vessel at a predetermined level and a fluid outlet that is used to withdraw decontaminated liquid. The contaminated liquid may be mixed with process aids (e.g., defoamers) and is treated by the gas within the vessel forming a process fluid within the vessel. The vessel includes an exhaust stack to allow gas to flow away from the vessel. In addition, the vessel includes one or more weirs that at least partially surround the tube or tubes and are submerged in the process fluid to create a fluid circulation path formed by the space between each weir, or each weir and the wall surface of the vessel, and the tubes. In one embodiment, each weir is open at both ends and forms a lower circulation gap between a first one of the weir ends and a bottom wall of the vessel and an upper circulation gap between a second one of the weir ends and the normal operating level of the process fluid within the vessel.

During operation, gas introduced through each tube mixes with the process fluid within the vessel in a first volume formed by each weir, or each weir and the walls of the vessel, and the tube, and the fluid mixture of gas and process fluid flows at high volume with a high degree of turbulence along the circulation path defined around the weir, thereby causing a high degree of mixing between the gas and the process fluid and any suspended particles within the liquid. Shear forces within this two-phase or three-phase turbulent flow region that result from the high density liquid phase overrunning the low density gas phase create extensive interfacial surface area between the gas and the process fluid that favors minimum residence time for mass and heat transfer between the liquid and gas phases to come to equilibrium when compared to conventional gas dispersion, techniques. Still further, vigorous mixing created by the turbulent flow hinders the formation of large crystals of precipitates within the process fluid and, because the system does not use small holes or any other small ports to introduce the gas into the process liquid, clogging and fouling associated with known submerged gas and diffused aeration evaporators/reactors are significantly reduced or entirely eliminated. Still further, the predominantly horizontal flow direction of the process fluid and gas mixture over the top of the weir and along the surface of the process fluid within the vessel enables the gas phase to disengage from the process fluid with minimal entrainment of liquid droplets due to the significantly greater momentum of the much higher density liquid that is directed primarily horizontally compared to the low density gas with a relatively weak but constant vertical momentum component due to buoyancy.

In addition, a method of remediating a contaminated liquid using a submerged gas evaporator includes providing the contaminated liquid to a vessel at a rate sufficient to maintain a process fluid surface at a predetermined level within the vessel, supplying a gas to the vessel, and turbulently mixing the gas and liquid within the vessel that forces the gas and process fluid into intimate contact over a large expanse of interfacial surface area within the vessel to thereby transfer heat energy and mass between the gas and liquid phases of a mixture and/or to otherwise react constituents within the gas and liquid phases of a mixture.

BRIEF DESCRIPTION OF THE DRAWINGS

FIG. 7 is a cross sectional view of a sixth air stripper having multiple mixing chambers within a single vessel.

DETAILED DESCRIPTION

The performance of air strippers according to the disclosure depends on the properties of the contaminants to be removed from a contaminated liquid feed stream, the properties of the contaminated liquid feed stream and the temperature and humidity of a gas mixed with the contaminated liquid feed stream. Usually, the contaminated liquid feed stream is contaminated water and the contaminants to be removed are volatile and/or semi-volatile compounds. As with conventional air strippers the removal efficiency for particular contaminants may be estimated by Henry's law which closely defines how each contaminant will partition between the liquid and gas phases. The advantages of air strippers according to the disclosure may be realized by substituting such air strippers for conventional air strippers in most air stripping applications. Wherever air strippers according to the disclosure are employed, conventional means may be employed to control the flow of the gas and the flow of contaminated liquid through the air stripper and, if required, to post-treat the liquid and/or gas streams. Likewise, most other conventional means of controlling air stripping systems to meet the requirements of a particular application may be employed. Also, multiple air strippers according to the invention may be connected in series or parallel configurations to meet the air stripping demand of a particular application.

Figure 1:
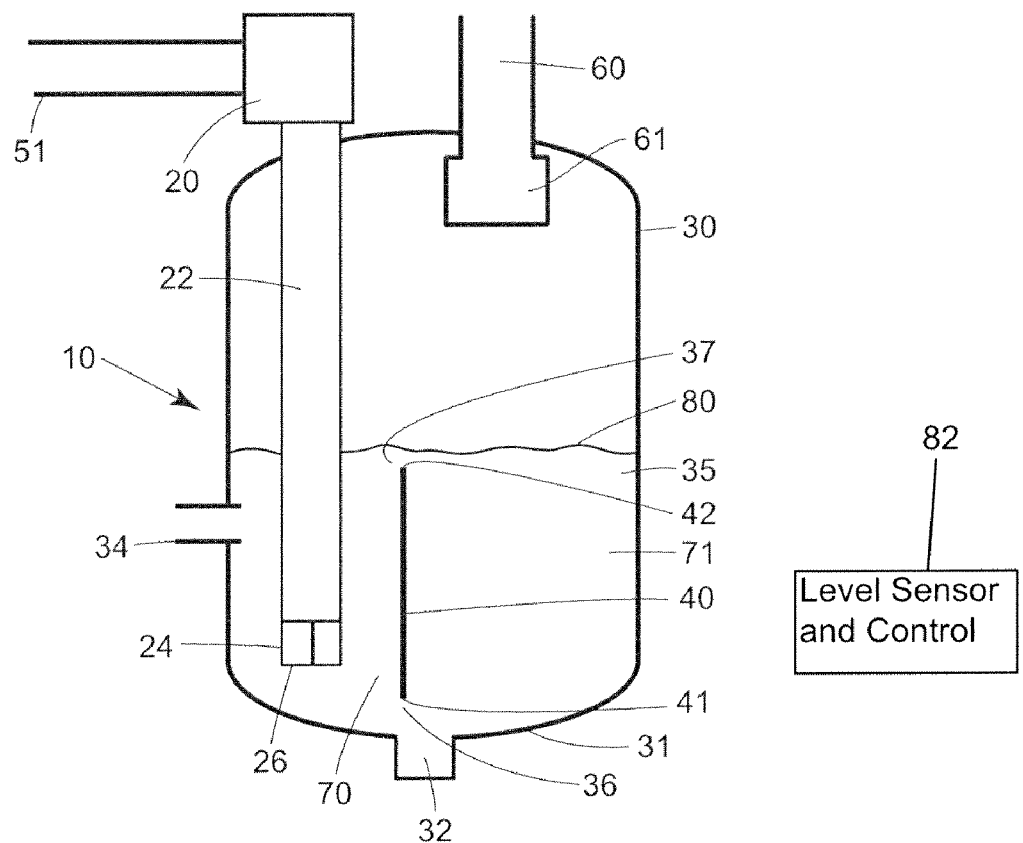
FIG. 1 is a cross-sectional view of an air stripper constructed in accordance with the teachings of the disclosure.

Referring to FIG. 1, an air stripper 10 includes a blower 20 and a gas supply tube or gas inlet tube 22 that provides gas (e.g., air or other readily available and desired gas) under positive pressure, the gas inlet tube 22 having sparge or gas exit ports 24 at or near an end 26 thereof. The gas inlet tube 22 is disposed within a vessel 30 having a bottom wall 31 and a fluid outlet port 32. A contaminated liquid inlet port 34 is disposed in one side of the vessel 30 and enables a contaminated liquid 35 to be provided into the interior of the vessel 30 and become part of the liquid mixture, process liquid 90, within vessel 30. The contaminated liquid may be, but is not limited to, groundwater, landfill leachate, industrial wastewater or produced water from oil or gas recovery wells, and surface water runoff from land used to raise livestock or crops. The air stripper of FIG. 1, is in the form of a single-stage air stripper operating in a back-mix mode. Back-mix mode means that a combination of all three of the following factors are occurring simultaneously: 1) the continuous addition and mixing of contaminated feed liquid 35 and any process aids that might be employed through inlet port 34 into the process liquid 90 within vessel 30, along with; 2) continuous recirculating flow of the process liquid 90 through gaps 36 and 37 and; 3) the continuous withdrawal of process fluid through outlet port 32 as decontaminated liquid. Thus, the back-mix mode relies on continuous thorough mixing of the contaminated liquid 35 feed and any process aids that might be used with the liquid mixture denoted as process liquid 90 within vessel 30 in combination with many passes of the process liquid 90 through the air-liquid contact zone within vessel 30 in order to maintain desirable (low) levels of contaminants in the process liquid 90 that is withdrawn through outlet port 32 as decontaminated liquid. However, because the feed of contaminated liquid is into the process liquid 90 is continuous, in the back-mix mode the level of contaminants in the decontaminated liquid will always be slightly elevated from the levels that might be attained if one or more air stripping units connected in series were employed in a manner such that the last stage air stripper has no direct hydraulic communication with the contaminated liquid inlet port 34. While the back-mix mode design is adequate to attain the desired level of decontamination of the liquid feed 35 in many common air stripper applications, in some difficult applications a multi-stage air stripper unit as shown in FIG. 7 may be more appropriate to achieve the desired result. In reference to the air stripper of FIG. 1 it is important to note that the process liquid 90 and the decontaminated fluid that is continuously withdrawn from outlet port 32, speaking in a practical sense, are identical in composition and therefore, for the purposes of this description they are considered indistinguishable and therefore considered to be one and the same. Process aids may include, for example defoaming agents, and these process aids may be provided to the interior of the vessel 30 through contaminated liquid inlet port 34. A decontaminated liquid outlet port 32 shown at the bottom of the vessel enables process liquid 90 to be withdrawn from the vessel 30. As has been explained for the air stripper 10 of FIG. 1 when operating in the continuous back-mix mode, the process fluid 90 is essentially decontaminated liquid and attains desirable decontaminated levels after a short time in the vessel. Thus, as long as the rate of decontaminated fluid removal allows an average residence time of the contaminated liquid in the vessel 30 that is greater than the average time to decontaminate the contaminated liquid, the process fluid 90 will be decontaminated fluid. The small amount of contaminated liquid added to the process fluid 90 and the vigorous mixing in the vessel 30 allow the process fluid 90 to remain at or below the required levels of decontamination.

Additionally, a weir 40, which is illustrated in FIG. 1 as a flat or solid plate member having a first or lower end 41 and a second or upper end 42, is disposed within the vessel 30 adjacent the gas inlet tube 22. The weir 40 defines and separates two volumes 70 and 71 within the vessel 30. As illustrated in FIG. 1, a gas exit port 60, disposed in the top of the vessel 30, enables gas to exit from the interior of the vessel 30. Gas removed from the vessel 30 through exit port 60 may be released to atmosphere or transferred into an appropriate downstream treatment process, such as an activated carbon absorption system (not shown), to remove contaminants. Disposed at or near a junction of the gas exit port 60 and the vessel 30 is a demister 61. The demister 61 removes droplets of process fluid that are entrained in the gas phase as the gas disengages from the liquid phase at the surface 80. The demister 61 may be a vane-type demister, a mesh pad-type demister, or any combination of commercially available demister elements. Further, a vane-type demister may be provided having a coalescing filter to improve demisting performance. The demister 61 may be mounted in any orientation and adapted to a particular vessel 30 including, but not limited to, horizontal and vertical orientations.

In the air stripper of FIG. 1, the blower 20 supplies air through a line 51 to the vessel 30. However, an induction fan (FIG. 2) could be used to draw the air into the vessel 30, in which case the pressure within the interior of vessel 30 would be less than atmospheric, instead of forcing the gas into the vessel 30 under positive pressure with the blower 20. Process fluid 90 (which is decontaminated) is withdrawn through the outlet port 32 at a rate that maintains the desired removal efficiency with respect to volatile pollutant(s) within contaminated liquid. The contaminated liquid and any process aids that may be used are supplied through the contaminated liquid inlet port 34 by a pump (not shown in FIG. 1) at a rate that maintains the surface 80 of the process fluid 90 within the vessel 30 at a predetermined level, which may be set by a user. A level sensor and control 82 may be used to determine and control the rate that the contaminated liquid is supplied through the contaminated liquid inlet port 34.

As illustrated in FIG. 1, the weir 40 is mounted within the vessel 30 to form a lower circulation gap 36 between the first end 41 of the weir 40 and the bottom wall 31 of the vessel 30 and to form an upper circulation gap 37 between the second end 42 of the weir 40 and the surface 80 (or the top wall of the vessel 30). As will be understood, the upper end 42 of the weir 40 is preferably set to be at or below the surface 80 when the process fluid 90 is at rest (i.e., when no gas is being introduced into the vessel 30 via the gas inlet tube 22). In some situations, it may be possible to set the upper end 42 of the weir 40 above the at rest level of the process fluid 90, as long as introduction of the gas via the gas inlet tube 22 still causes flow over the upper end 42 of the weir 40. In any event, as illustrated in FIG. 1, the weir 40 also defines and separates the confined volume or space 70 in which the sparge ports 24 are located from the volume or space 71. If desired, the weir 40 may be mounted to the vessel 30 via welding, bolts or other fasteners attached to internal side walls of the vessel 30.

During operation, gas from the line 51 is forced to flow under pressure into and through the gas inlet tube 22 before reaching the sparge or exit ports 24. The gas exits the gas inlet tube 22 through the sparge ports 24 into the confined volume 70 formed between the weir 40, the wall of the vessel 30 and the gas inlet tube 22, causing the gas to be dispersed into the continuous liquid phase of the process fluid 90 within the vessel 30. Generally speaking, gas exiting from the sparge ports 24 mixes with the process fluid 90 within the confined volume 70 and causes a high volume flow pattern to develop around the weir 40. The velocity of the flow pattern and hence the turbulence associated with the flow pattern is highest within the confined volume 70 and at the locations where the process fluid 90 flows through the upper gap 37 and the lower gap 36 of the weir 40. The turbulence within the confined volume 70 significantly enhances dispersion of the gas into the process fluid 90 which, in turn, provides for efficient heat and mass transfer between the gas and the process fluid 90. In particular, after exiting the sparge ports 24, the gas is dispersed as a discontinuous gas phase into a continuous liquid phase of the process fluid 90 forming a gas/process fluid mixture within the confined volume 70. The mass per unit volume of the gas/process fluid mixture within the confined volume 70 is significantly less than the average mass per unit volume of the mixture of gas and process fluid in the volume 71. Due to this large difference in mass per unit volume of process fluid 90 compared to the gas, typically in the order of approximately 1000 to 1, the mass per unit volume of the gas/liquid mixture in the confined volume 70 is significantly less than that of the average gas/liquid mixture in the volume 71. This large difference in mass per unit volume creates a difference in static hydraulic pressure between the gas/liquid mixture in the confined volume 70 and the gas/liquid mixture within the volume 71 at all elevations within the vertical extent of the weir. This imbalance in static hydraulic pressure forces the process fluid 90 to flow from the higher pressure region, i.e., the volume 71, to the lower pressure region, i.e., the confined volume 70, at a rate that overcomes the impressed static hydraulic pressure imbalance and creates flow upward through the confined volume 70.

Put another way, the dispersion of gas into the process fluid 90 within the confined volume 70 at the sparge ports 24 develops a continuous flow pattern that draws process fluid 90 under the bottom edge 41 of the weir 40 through the lower circulation gap 36, and causes the mixture of gas and process fluid 90 to move through the confined volume 70 and toward the surface 80. Near the surface 80, the gas/liquid mixture reaches a point of balance at which the imbalance of static hydraulic pressure is eliminated. Generally speaking, this point is at or near the upper circulation gap 37 formed between the second end 42 of the weir 40 and the surface 80. At this balance point, the force of gravity, which becomes the primary outside force acting on the gas/liquid mixture, gradually reduces the vertical momentum of the gas/liquid mixture to near zero. This reduced vertical momentum, in turn, causes the gas/liquid mixture to flow in a predominantly horizontal direction over the second end 42 of the weir 40 (through the circulation gap 37 defined at or near the surface 80 of the process fluid 90) and into the volume 71.

This flow pattern around the weir 40 affects the dispersion of the gas into the continuous liquid phase of the process fluid 90 and, in particular, creates turbulent mixing action throughout the confined volume 70 and the volume 71 and within the continuous liquid phase of the process fluid 90 while creating a substantially horizontal flow pattern of the gas/liquid mixture formed within confined volume 70 at or near the surface 80. This horizontal flow pattern significantly mitigates the potential for entrained liquid droplets to be carried vertically upward along with the dispersed gas phase as the dispersed gas phase rises through the liquid phase due to buoyancy and finally disengages from the continuous liquid phase of the process fluid 90 at the surface 80.

Also, the mixing action created by the induced flow of liquid and liquid/gas mixtures within both the confined volume 70 and the volume 71 hinders the formation of large crystals of precipitates, which generally requires a quiescent environment. Thus, the mixing action selectively favors the production of relatively small particles of precipitates helps ensure that the suspended particles formed in the air stripping process remain in suspension within the liquid phase circulating around the weir 40, which effectively mitigates the formation of blockages and fouling within the air stripper. Likewise, because relatively small particles formed through precipitation are readily maintained in suspension, the efficiency of the air stripper is improved over conventional air stripping systems in terms of freedom from clogging and fouling.

In addition, as the circulating process fluid 90 within volume 71 approaches the bottom wall 31 of the vessel 30, the process fluid 90 is forced to flow in a predominantly horizontal direction and through the lower gap 36 into the confined volume 70. This predominantly horizontal flow pattern near the bottom wall 31 of the vessel 30 creates a scouring action at and above the interior surface of the bottom wall 31 which maintains particles of solids including precipitates in suspension within the circulating liquid while the air stripper is operating. The scouring action at and near the bottom wall 31 of the vessel 30 also provides means to re-suspend settled particles whenever the air stripper is re-started after having been shutdown for a period of time sufficient to allow suspended particles to settle on or near the bottom wall 31.

As is known, air stripping is a process that affects transfer of volatile compounds from a liquid phase to a gas phase by creating intimate contact between a flowing stream of gas and the liquid, which may be a compound, a solution or slurry. Within an air stripping process that uses a submerged gas evaporator, heat and mass transfer operations occur simultaneously at the interface formed by the dynamic boundaries of the discontinuous gas and continuous liquid phases. Thus, all submerged gas evaporator type air strippers include some method to disperse gas within a continuous liquid phase. The system shown in FIG. 1 however integrates the functions of dispersing the gas into the liquid phase, providing thorough agitation of the liquid phase, and mitigating entrainment of liquid droplets with the gas phase as the gas disengages from the liquid. Additionally, the turbulence and mixing that occurs within the vessel 30 due to the flow pattern created by dispersion of gas into liquid within the confined volume 70 reduces the formation of large crystals of precipitates and/or large agglomerates of smaller particles within the vessel 30.

Figure 2:
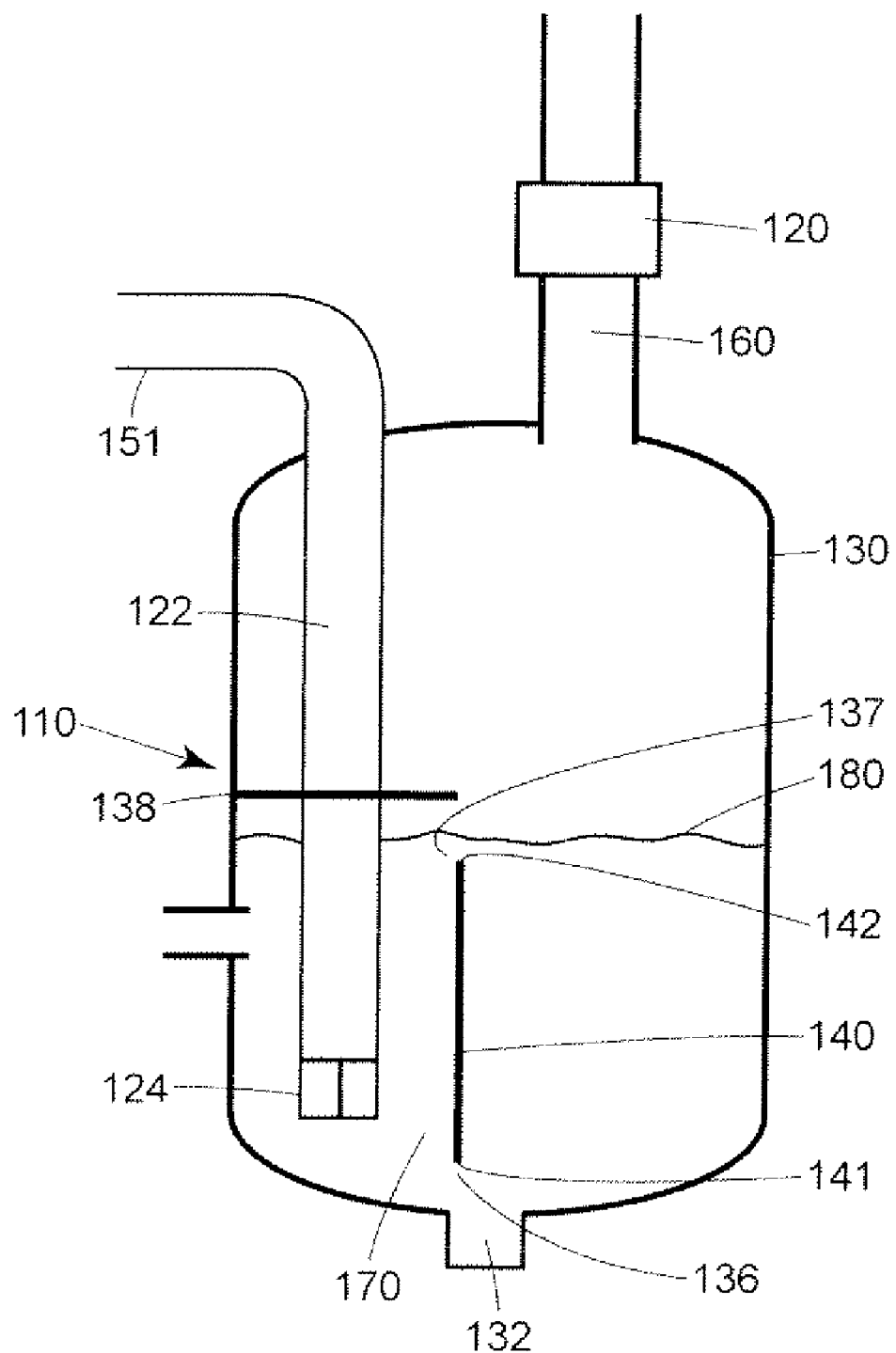
FIG. 2 is a cross-sectional view of a second air stripper including a baffle.

FIG. 2 illustrates a second embodiment of an air stripper 110, which is very similar to the air stripper 10 of FIG. 1 and in which elements shown in FIG. 2 are assigned reference numbers being exactly 100 greater than the corresponding elements of FIG. 1. Unlike the device of FIG. 1, the air stripper 110 includes a baffle or a shield 138 disposed within the vessel 130 at a location slightly above or slightly below the surface 180 and above the second end 142 of the weir 140. The baffle or shield 138 may be shaped and sized to conform generally to the horizontal cross-sectional area of the confined volume 170. Additionally, if desired, the baffle 138 may be mounted to any of the gas inlet tube 122, the vessel 130 or the weir 140. The baffle 138 augments the force of gravity near the balance point by presenting a physical banner that abruptly and positively eliminates the vertical components of velocity and hence, momentum, of the gas/liquid mixture, thereby assisting the mixture to flow horizontally outward and over the weir 140 at the upper circulation gap 137. The baffle enhances the mitigation of entrained liquid droplets within the gas phase as the gas disengages from the liquid. Furthermore, the blower 120 (in this case an induction fan) is disposed on the gas exit port 160 in this embodiment, thus providing gas to the evaporator vessel 130 under negative pressure i.e., via suction.

As will be understood, the weirs 40 and 140 of FIGS. 1 and 2 may be generally flat plates or may be curved plates that extend across the interior of the vessel 30 between different, such as opposite, sides of the vessel 30. Basically, the weirs 40 and 140 create a barrier within the vessel defining and separating the volumes 70 and 71 (and 170 and 171). While the weirs 40 and 140 are preferably solid in nature they may, in some cases, be perforated, for instance, with slots or holes to modify the flow pattern within the vessel 30 or 130, or to attain a particular desired mixing result within the volume 71 or 171, while still providing a substantial barrier between the volumes 70 and 71 or 170 and 171. Additionally, while the weirs 40 and 140 may extend across the vessels 30 and 130 between opposite walls of the vessels 30 and 130, they may be formed into any desired shape so long as a substantial vertical barrier is formed to isolate one volume 70 (or 170) closest to the gas inlet tube 22 from the volume 71 (or 171) on the opposite side of the weir 40, 140.

Figure 3:
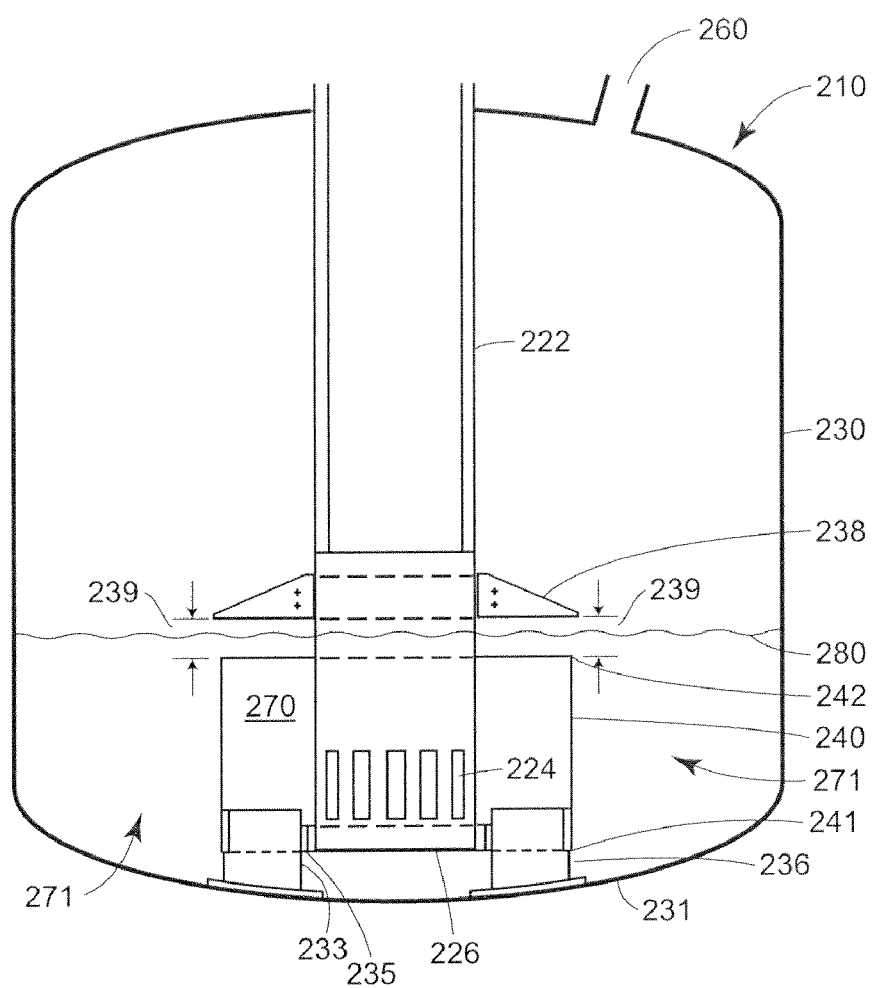
FIG. 3 is a cross-sectional view of a third air stripper having a tubular shaped weir.

FIG. 3 illustrates a cross-sectional view of another air stripper 210 having a weir 240 that extends around a gas inlet tube 222. The air stripper 210 may be a submerged gas evaporator, a submerged gas reactor or a combination submerged gas evaporator/reactor. A blower device (not shown in FIG. 3) delivers approximately 3,500 standard cubic feet per minute (scfm) of gas to the gas inlet lube 222. While the dimensions of the air stripper 210 are exemplary only, the ratios between these dimensions may serve as a guide for those skilled in the art to achieve a desirable balance between three desirable process results including: 1) preventing the formation of large crystals of precipitates and/or agglomerates of solid particles while maintaining solid particles as a homogeneous suspension within the process liquid by controlling the degree of overall mixing within vessel 230; 2) enhancing the rates of heat and mass transfer and any desirable chemical reactions by controlling the turbulence and hence interfacial surface area created between the gas and liquid phases within confined volume 270; and 3) mitigating the potential of entraining liquid droplets in the gas as the gas stream disengages from the liquid phase at the surface 280 by maintaining a desirable and predominately horizontal velocity component for the gas/liquid mixture flowing outward over the second end 242 of the weir 240 and along the surface 280 within vessel 230. As illustrated in FIG. 3, the air stripper 210 includes a vessel 230 with a dished bottom having an interior volume and a vertical gas inlet tube 222 at least partially disposed within the interior volume of the vessel 230. In this case, the gas inlet tube 222 has a diameter of approximately 20 inches and the overall diameter of the vessel 230 is approximately 120 inches, but these diameters may be more or less based on the design capacity and desired result as related to both gas and liquid flow rates and the type of blower device (not shown in FIG. 3) supplying gas to the air stripper. In this example the weir 240 has a diameter of approximately 40 inches with vertical walls approximately 26 inches in length. Thus, the weir 240 forms an annular confined volume 270 within vessel 230 between the weir 240 and the gas inlet tube 222 with cross sectional area of approximately 6.54 square feet ($ft^2$) and volume of approximately 14.18 cubic feet ($ft^3$). In the embodiment of FIG. 3, twelve sparge ports 224 are disposed near the bottom of the gas inlet tube 222. The sparge ports 224 are substantially rectangular in shape and are, in this example, each approximately 3 inches wade by 7¼ inches high or approximately 0.151 ft2 in area for a combined total area of approximately 1.81 ft2 for all twelve sparge ports 224. Additionally, the sparge ports 224 of this embodiment are arranged generally parallel to the flow direction of the gas/liquid phase, further reducing the possibility of the sparge ports becoming clogged.

As will be understood, the gas exits the gas inlet tube 222 through the sparge ports 224 into a confined volume 270 formed between the gas inlet tube 222 and a tubular shaped weir 240. In this case, the weir 240 has a circular cross-sectional shape and encircles the lower end of the gas inlet tube 222. Additionally, the weir 240 is located at an elevation which creates a lower circulation gap 236 of approximately 4 inches between a first end 241 of the weir 240 and a bottom dished surface 231 of the vessel 230. The second end 242 of the weir 240 is located at an elevation below a normal or at rest operating level of the process fluid 290 within the vessel 230. Further, a baffle or shield 238 is disposed within the vessel 230 approximately 8 inches above the second end 242 of the weir 240. The baffle 238 is circular in shape and extends radially outwardly from the gas inlet tube 222. Additionally, the baffle 238 is illustrated as having an outer diameter somewhat greater than the outer diameter of the weir 240 which, in this case, is approximately 46 inches. However, the baffle 238 may have the same, a greater or smaller diameter than the diameter of the weir 240 if desired. Several support brackets 233 are mounted to the bottom surface 231 of the vessel 230 and are attached to the weir 240 near the first end 241 of the weir 240. Additionally, a gas inlet tube stabilizer ring 235 is attached to the support brackets 233 and substantially surrounds the bottom end 226 of the gas inlet tube 222 to stabilize the gas inlet tube 222 during operation.

During operation of the air stripper 210, gas is ejected through the sparge ports 224 into the confined volume 270 between the gas inlet tube 222 and the weir 242 creating a mixture of gas and process fluid 290 within the confined volume 270 that is significantly reduced in bulk density compared to the average bulk density of the fluid located in the volume 271 outside of the wall of the weir 240. This reduction in bulk density of the gas/liquid mixture within confined volume 270 creates an imbalance in head pressure at all elevations between the surface 280 within vessel 230 and the first end 241 of the weir 240 when comparing the head pressure within the confined volume 270 and head pressure within the volume 271 outside of the wall of the weir 240 at equal elevations within the vertical extent of the weir. The reduced head pressure within the confined volume 270 induces a How pattern of liquid from the higher head pressure regions of volume 271 through the circulation gap 236 and into the confined volume 270. Once established, this induced flow pattern provides vigorous mixing action both within the confined volume 270 and throughout the volume 271 as liquid from the surface 280 and all locations within the volume 271 is drawn downward through the circulation gap 236 and upward through the confined volume 270 where the gas/liquid mixture flows outward over the second end 242 of the weir 240 and over the surface 280 confined within the vessel 230.

Within confined volume 270, the induced flow pattern and resultant vigorous mixing action creates significant shearing forces that are primarily based on the gross difference in specific gravity and hence momentum vectors between the liquid and gas phases at all points on the interfacial surface area of the liquid and gas phases. The shearing forces driven by the significant difference in specific gravity between the liquid and gas phases, which is, generally speaking, of a magnitude of 1000:1 liquid to gas, cause the interfacial surface area between the gas and liquid phases to increase significantly as the average volume of each discrete gas region within the mixture becomes smaller and smaller due to the shearing force of the flowing liquid phase. Thus, as a result of the induced flow pattern and the associated vigorous mixing within the confined area 270, the total interfacial surface area increases as the gas/liquid mixture flows upward within confined volume 270. This increase in interfacial surface area or total contact area between the gas and liquid phases favors increased rates of heat and mass transfer and chemical reactions between constituents of the gas and liquid phases as the gas/liquid mixture flows upward within confined volume 270 and outward over the second end 242 of the weir 240.

At the point where gas/liquid mixture flowing upward within confined volume 270 reaches the elevation of the surface 280 and having passed beyond the second edge 242 of the weir 240, the difference in head pressure between the gas/liquid mixture within the confined volume 270 and the gas/liquid mixture within volume 271 is eliminated. Absent the driving force of differential head pressure and the confining effect of the wall of the weir 240, gravity and the resultant buoyancy of the gas phase within the liquid phase become the primary outside forces affecting the continuing flow patterns of the gas/liquid mixture exiting the confined space 270. The combination of the force of gravity and the barrier created by the baffle 238 in the vertical direction eliminates the vertical velocity and momentum components of the flowing gas/liquid mixture at or below the elevation of the bottom of the baffle 238 and causes the velocity and momentum vectors of the flowing gas/liquid mixture to be directed outward through the gap 239 created by the second end 242 of the weir 240 and the bottom surface of the baffle 238 and downwards near the surface 280 within the vessel 230 causing the continuing flow pattern of the gas/liquid mixture to assume a predominantly horizontal direction. As the gas/liquid mixture flows outwards in a predominantly horizontal direction, the horizontal velocity component continually decreases causing a continual reduction in momentum and a reduction of the resultant shearing forces acting at the interfacial surface area within the gas/liquid mixture. The reduction in momentum and resultant shearing forces allows the force of buoyancy to become the primary driving force directing the movement of the discontinuous gas regions within the gas/liquid mixture, which causes discrete and discontinuous regions of gas to coalesce and ascend vertically within the continuous liquid phase. As the ascending gas regions within the gas/liquid mixture reach the surface 280 within the vessel 230, buoyancy causes the discontinuous gas phase to break through the surface 280 and to coalesce into a continuous gas phase that is directed upward within the confines of the vessel 230 and into the gas exit port 260 under the influence of the differential pressure created by the blower or blowers (not shown in FIG. 3) supplying gas to the air stripper 210.

Figure 4:
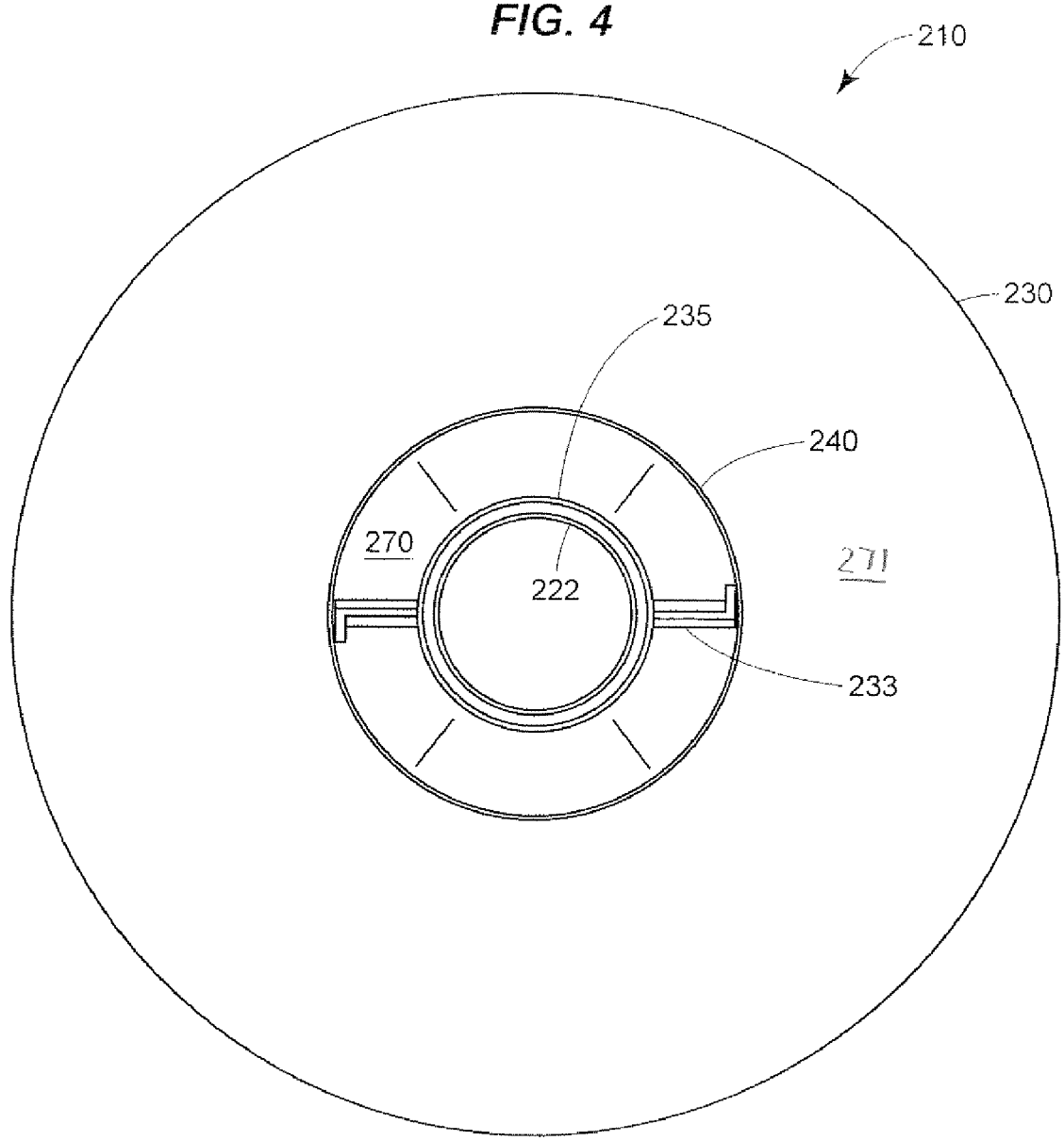
FIG. 4 is a top plan view of the air stripper of FIG. 3.

FIG. 4 is a top plan view of the air stripper 210 of FIG. 3 illustrating the tubular nature of the weir 240. Specifically, the generally circular gas inlet tube 222 is centrally located and is surrounded by the stabilizer ring 235. In this embodiment, the stabilizer ring 235 surrounds the gas inlet tube 222 and essentially restricts any significant lateral movement of the gas inlet tube 222 due to surging or vibration such as might occur upon startup of the system. While the stabilizer ring 235 of FIG. 4 is attached to the support brackets 233 at two locations, more or fewer support brackets 233 may be employed without affecting the function of the air stripper 210. The weir 240, which surrounds the gas inlet tube 222 and the stabilizer ring 235, and is disposed co-axially to the gas inlet tube 222 and the stabilizer ring 235, is also attached to, and is supported by the support brackets 233. In this embodiment, the confined volume 270 is formed between the weir 240 and the gas inlet tube 222 while the second volume 271 is formed between the weir 240 and the side walls of the vessel 230. As will be understood, in this embodiment, the introduction of the gas from the exit ports 224 of the gas inlet tube 220 causes contaminated liquid to flow in an essentially toroidal pattern around the weir 240.

Some design factors relating to the design of the air stripper 210 illustrated in FIGS. 3 and 4 are summarized below and may be useful in designing larger or smaller air strippers, which may be used as evaporators or as chemical reaction devices or both. The shape of the cross sectional area and length of the gas inlet tube is generally set by the allowable pressure drop, the configuration of the process vessel, and the costs of forming suitable material to match the desired cross sectional area and the characteristics of the blower that is coupled to the air stripper. However, it is desirable that the gas inlet tube 222 provides adequate surface area for openings of the desired shape and size of the sparge ports which in turn admit the gas to the confined volume 271. For a typical air stripper the vertical distance between the top edge 242 of the weir 240 and the top edge of the sparge ports should be not less than about 6 inches and preferably is at least about 17 inches. Selecting the shape and, more particularly, the size of the sparge port 224 openings is a balance between allowable pressure drop and the initial amount of interfacial area created at the point where the gas is dispersed into the flowing liquid phase within confined volume 271. The open area of the sparge ports 224 is generally more important than the shape, which can be most any configuration including, but not limited to, rectangular, trapezoidal, triangular, round, oval. In general, the open area of the sparge ports 224 should be such that the ratio of gas flow to total combined open, area of all sparge ports should at least be in the range of 1,000 to 18,000 acfm per $ft^2$, preferably in the range of 2,000 to 10,000 acfm/$ft^2$ and more preferably in the range of 2,000 to 8,000 acfm/$ft^2$, where acfm is referenced to the operating temperature within the gas inlet tube. Likewise, the ratio of the gas flow to the cross sectional area of the confined volume 270 ($CSA_{confined\ volume}$) should be at least in the range of 400 to 10,000 scfm/$ft^2$, preferably in the range of 500 to 4,000 scfm/$ft^2$ and more preferably in the range of 500 to 2,000 scfm/$ft^2$. Additionally, the ratio of the cross sectional area of the vessel 230 ($CSA_{vessel}$) to the cross sectional area of the confined volume 270 is preferably in the range from three to one (3.0:1) to two-hundred to one (200:1), is more preferably in the range from eight to one (8.0:1) to one-hundred to one (100:1) and is highly preferably in the range of about ten to one (10:1) to fourteen to one (14:1). These ratios are summarized in the table below. Of course, in some circumstances, other ratios for these design criteria could be used as well or instead of those particularly described herein.

TABLE 1

| Ratios | Preferred Embodiment | Acceptable Range | Preferred Range |
| --- | --- | --- | --- |
| acfm per Total $CSA_{sparge\ ports}$ | 2,000-8,000 acfm/$ft^2$ | 1,000-18,000 acfm/$ft^2$ | 2,000-10,000 acfm/$ft^2$ |
| scfm per $CSA_{confined\ volume}$ | 500-2,000 scfm/$ft^2$ | 400-10,000 scfm/$ft^2$ | 500-4000 scfm/$ft^2$ |
| $CSA_{vessel}$ Ratio to $CSA_{confined\ volume}$ | 10:1-14:1 | 3.0:1-200:1 | 8:1-100:1 |

Figure 5:
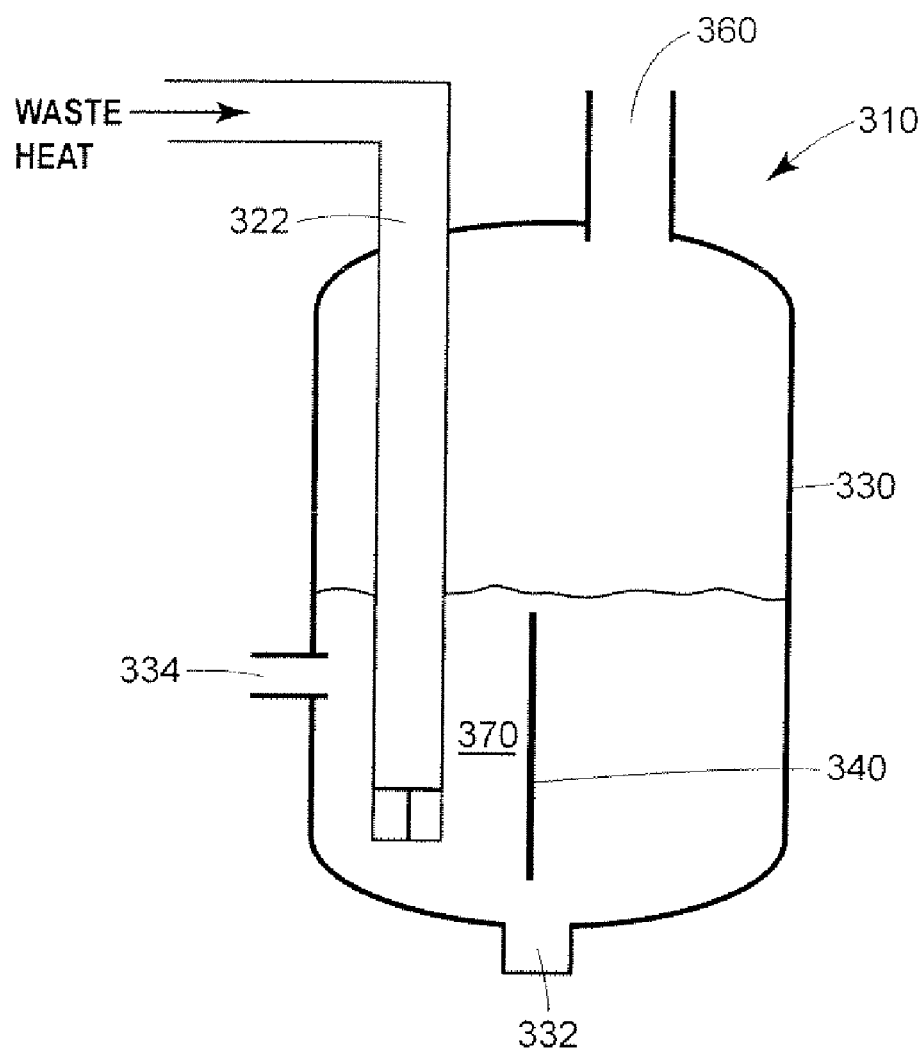
FIG. 5 is a cross-sectional view of a fourth air stripper connected to a source of waste heat.

Turning now to FIG. 5, an air stripper in the form of a submerged gas evaporator/reactor 310 is shown which is similar to the submerged gas evaporator of FIG. 1, and in which like components are labeled with numbers exactly 300 greater than the corresponding elements of FIG. 1. Unlike the device 10 of FIG. 1, the air stripper 310 of FIG. 5 may or may not include a blower system but, otherwise as shown receives hot gases directly from an external source, which may be for example, a flare stack, a reciprocating engine, a turbine, or other source of waste heat. The hot gases supplied by the external source may include a wide range of temperature and/or specific components and these hot gases may be selected by one skilled in the art to achieve any combination of a rate and degree of chemical reaction between components in the gas and liquid, a specific rate of evaporation or to strip contaminants from a liquid or create a desirable concentration of the liquid over time. Alternately, in the absence of an appropriate waste heat source, a burner may be coupled directly to the inlet gas tube 322 to supply heated combustion air directly to the air stripper. By heating the contaminated liquid undergoing processing, the efficiency in removing contaminants can be significantly improved.

Figure 6:
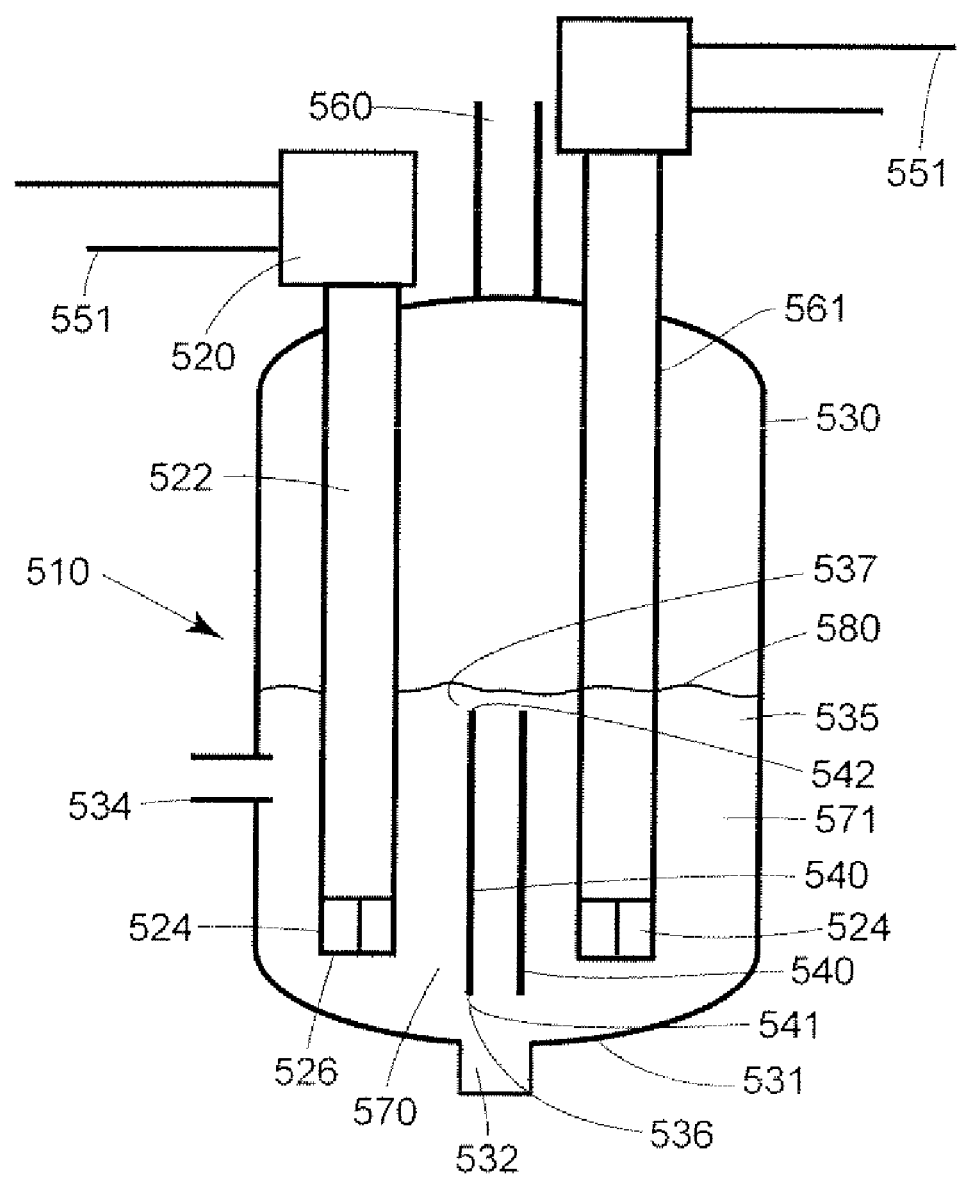
FIG. 6 is a cross sectional view of a fifth air stripper having multiple gas tubes and multiple weirs.

The embodiment of an air stripper shown in FIG. 6 includes multiple gas tubes 522 and multiple weirs 540. The vessel 530 may include more than one gas tube 522 and/or more than one weir 540 to increase mass transfer efficiency without a significant increase in the size of the air stripper 510 or to use a combination of gases, which may or not include air to treat contaminated liquid.

The embodiment of an air stripper shown in FIG. 7 includes multiple gas tubes 822 and multiple weirs 840 within a single vessel 830, like the embodiment shown in FIG. 6. However, the embodiment shown in FIG. 7 is arranged to provide sequential (multi-stage) processing by having a series of baffles 892a, 892b that divide the vessel into three treatment chambers 894a, 894b, 894c. Of course, more or less than three treatment chambers may be used depending on the amount of space available and the required level of decontamination. Generally, the more treatment chambers 894a, 894b, 894c, the greater the decontamination of the process fluid 890. The contaminated fluid enters the vessel 830 into the first treatment chamber 894a. The contaminated fluid mixes with the process fluid 890 in the first treatment chamber 894a. The process fluid 890 is then sequentially treated in each subsequent treatment chamber 894b, 894c further reducing contaminant levels in each treatment chamber 894a, 894b, 894c. The decontaminated process fluid 890 is removed from the last treatment chamber 894c at its lowest level of contamination. The additional decontamination accomplished in each chamber is due in part to the introduction of fresh gas into each treatment chamber 894a, 894b, 894c.

It will be understood that, because the weir and gas dispersion configurations within the air strippers illustrated in the embodiments of FIGS. 1-7 provide for a high degree of mixing, induced turbulent flow and the resultant intimate contact between liquid and gas within the confined volumes 70, 170, 270, etc. the air strippers of FIGS. 1-7 create a large interfacial surface area for the interaction of the contaminated liquid (and thus the process fluid) and the gas provided via the gas inlet tube, leading to very efficient heat and mass transfer between gas and liquid phases and/or high rates of chemical reactions between components within these two phases. Furthermore, the use of the weir and, if desired, the baffle, to cause a predominantly horizontal flow pattern of the gas/liquid mixture at the surface of the process fluid mitigates or eliminates the entrainment of droplets of contaminated liquid within the exhaust gas. Still further, the high degree of turbulent flow within the vessel mitigates or reduces the formation of large crystals or agglomerates and maintains the mixture of solids and liquids within the evaporator/reactor vessel in a homogeneous state to prevent or reduce settling of precipitated solids. This factor, in turn, reduces or eliminates the need to frequently clean the vessel and can be extremely valuable in situations where the contaminated liquid 35, 135, etc. contains both volatile pollutants and non-volatile pollutants that may be dissolved or suspended in the contaminated liquid 35, 135, etc. In such cases the advantages of the invention can be used to transfer the volatile pollutants to a gas phase while simultaneously significantly reducing the volume of the process fluid 90, 190, etc. through evaporation (concentration of the process fluid 90, 190, etc.). Highly concentrated process fluid 90, 190, etc. may be realized because the turbulent mixing action can maintain significant levels of solid particles within suspension and there are no extended surfaces or small passageways or openings within the system to become coated with deposits or clogged.

While several different types air strippers having different weir configurations are illustrated herein, it will be understood that the shapes and configurations of the components, including the weirs, baffles, liquid entry ports, liquid discharge ports, gas entry ports and gas discharge ports used in these devices could be varied or altered as desired. Thus, for example, while the gas inlet tubes are illustrated as being circular in cross section, these tubes could be of any desired cross sectional shape including, for example, square, rectangular, oval, etc. Additionally, while the weirs illustrated herein have been shown as flat plates or as tubular members having a circular cross-sectional shape, weirs of other shapes or configurations could be used as well, including weirs having a square, rectangular, oval, or other cross sectional shape disposed around a gas inlet tube, weirs being curved, arcuate, or multi-faceted in shape or having one or more walls disposed partially around a fire or gas inlet tube, etc. Also, the gas entry ports shown as rectangular may assume most any shape including trapezoidal, triangular, circular, oval, or triangular. Furthermore, the weirs need not be solid surfaces and may be perforated or latticed if desired.

Still further, as will be understood, the terms submerged gas reactor, submerged gas evaporator and submerged gas processor have been used herein to generally describe air strippers as well as other devices. As a result, any of the air strippers described or illustrated herein maybe used as evaporators or as chemical reaction devices or both. Likewise, the principles described herein may be used on a submerged combustion gas evaporator or reaction device, e.g., one that combusts fuel in a burner directly coupled to the air stripper to create the gas, or on a non-combustion gas evaporator or reaction device, e.g., one that accepts gas from a different source. In the later case, the gas may be heated gas from any desired source, such as an output of a reciprocating engine or a turbine, a process fueled by landfill gas, or any other source of heated gas, or a non heated source, such as ambient air or other non heated gases. A reciprocating engine or turbine may operate on landfill gas or on other types of fuel. Of course, generally speaking, the air strippers described herein may be connected to any source of waste heat and/or may be connected to or include a combustion device of any kind that, for example, combusts one or a combination of a biogas, a solid fuel (such as coal, wood, etc.), a liquid fuel (such as petroleum, gasoline, fuel oil, etc.) or a gaseous fuel. Alternatively, the gas used in the submerged gas evaporator/reactor may be non-heated and may even be at the same or a lower temperature than the liquid within the vessel, and may be provided to induce a chemical or physical reaction of some sort such as the formation of a desirable precipitate.

Still further, as will be understood by persons skilled in the art, the air strippers described herein may be operated in continuous, batch or combined continuous and batch modes. Thus, in one instance the air stripper may be initially charged with a controlled amount of contaminated liquid or process fluid and operated in a batch mode. In the batch mode, liquid feed is continuously added to the air stripper to maintain a constant predetermined level within the vessel by replacing any components of the contaminated liquid (or process fluid) that are evaporated or otherwise withdrawn from the vessel as the process proceeds. Once the batch process has reached a predetermined degree of concentration, completeness of a chemical reaction, amount or form of precipitate, or any combination of these or other desirable attributes, the process may be shutdown and the desirable product of the process may be withdrawn from the air stripper for use, sale or disposal. Likewise, the air stripper may be initially charged with a controlled amount of contaminated liquid (or process fluid) and operated in a continuous mode. In the continuous mode, liquid feed would be continuously added to the air stripper to maintain a constant predetermined level within the vessel by replacing any components of the contaminated liquid (or process fluid) that are evaporated or otherwise withdrawn from the vessel as the process proceeds. Once the fluid undergoing processing has reached a predetermined degree of concentration, completeness of a chemical reaction, amount or form of precipitate, or any combination of these or other desirable attributes, withdrawal of process fluid at a controlled rate from the vessel would be initiated. The controlled withdrawal of process fluid would be set at an appropriate rate to maintain a desirable equilibrium between the rate of feed of the liquid and the gas, the rate of evaporation of components from the contaminated liquid, and one or more selected values that meet the desired attributes of the process fluid. Thus, in the continuous mode, the air stripper may operate for an indeterminate length of time as long as there is contaminate liquid available and the system remains operational. The combined continuous and batch mode refers to operation where, for instance, the amount of available contaminated liquid is in excess of that required for a single batch operation, in which case the process may be operated for relatively short periods in the continuous mode until the supply of contaminate liquid is exhausted.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. An air stripper comprising:
   a vessel having an interior for receiving a contaminated liquid;
   a tube disposed within the vessel, the tube forming a fluid path for transporting a gas into the interior of the vessel;
   a weir disposed within the vessel adjacent the tube;
   a gas exit port forming a fluid path out of the vessel for transporting the gas from the interior of the vessel;
   a contaminated liquid inlet, the contaminated liquid inlet forming a liquid path for supplying contaminated liquid to the interior of the vessel;
   a process fluid outlet port, the process fluid outlet port forming a liquid path for withdrawing process fluid from the interior of the vessel; and
   a level sensor and control that measures a level of process fluid within the vessel and controls the rate of contaminated liquid supplied into the vessel through the contaminated liquid inlet and the amount of process fluid withdrawn out of the vessel through the process fluid outlet port in order to maintain process fluid within the vessel at a predetermined operating level;
   wherein the weir includes a first weir end and a second weir end and is disposed within the vessel to define a first process fluid circulation gap between the first weir end and a first wall of the vessel and to define a second process fluid circulation gap between the second weir end and a second wall of the vessel which enables process fluid in a continuous liquid phase within the vessel to flow through the first and second circulation gaps when gas is introduced into the vessel from the tube, the first and second weir ends being disposed below the predetermined operating level of the process fluid within the vessel, and
   wherein the contaminated liquid includes volatile compounds.

2. The air stripper of claim 1 further including a baffle disposed proximate the second circulation gap and generally perpendicular to the weir.

3. The air stripper of claim 2, wherein the distance between the second weir end and the baffle is in the range of 1 to 20 inches.

4. The air stripper of claim 2, wherein the baffle is attached to the tube.

5. The air stripper of claim 2, wherein the baffle is attached to an interior wall of the vessel.

6. The air stripper of claim 1, wherein the tube includes a sparge port disposed below the predetermined operating level of the process fluid within the vessel, gas flowing out of the tube entering the interior of the vessel through the sparge port.

7. The air stripper of claim 6, further including a plurality of sparge ports disposed in the tube, wherein each sparge port is substantially rectangular in shape.

8. The air stripper of claim 1, further comprising a blower connected to the tube.

9. The air stripper of claim 1, further comprising an induction fan connected to the gas exit port.

10. The air stripper of claim 1, further including a reinforcing plate attached to the vessel and attached to the weir.

11. The air stripper of claim 10, further including a stabilizer ring attached to the reinforcing plate and disposed between the tube and the weir.

12. The air stripper of claim 1, wherein the weir comprises a tubular member disposed around the tube.

13. The air stripper of claim 12, wherein the tubular member is circular in cross section.

14. The air stripper of claim 12, wherein the tubular member is disposed co-axial to the tube.

15. The air stripper of claim 1, wherein the weir comprises a generally flat plate member.

16. The air stripper of claim 1, wherein the tube is connected to a source of waste heat.

17. The air stripper of claim 1, further including a blower attached to the tube.

18. The air stripper of claim 16, wherein the generally flat plate member extends across the interior of the vessel between opposite sides of the vessel.

19. The air stripper of claim 16, wherein the source of the waste heat is one or a combination of a biogas processing device, a reciprocating internal combustion engine operating on biogas and/or a turbine operating on biogas.

20. The air stripper of claim 19, wherein the source of waste heat combusts landfill gas.

21. The air stripper of claim 1 further comprising a demister to remove entrained liquid droplets from the gas before the gas exits the vessel.

22. The air stripper of claim 21 wherein the demister is a vane-type demister.

23. The air stripper of claim 21 wherein the demister is a mesh pad-type demister.

24. The air stripper of claim 21 wherein the demister is a combination of a vane-type demister and a mesh pad-type demister.

25. The air stripper of claim 21 wherein the demister is a vane-type demister having a coalescing filter.

26. The air stripper of claim 1 further comprising a plurality of gas tubes.

27. The air stripper of claim 1 further comprising a plurality of weirs.

28. The air stripper of claim 1 further comprising a plurality of blowers.

\* \* \* \* \*